(12) United States Patent
Barranco et al.

(10) Patent No.: US 8,589,595 B2
(45) Date of Patent: Nov. 19, 2013

(54) COMMUNICATIONS DEVICE AND SYSTEM FOR IMPLEMENTING A MANAGEMENT SYSTEM REMOTE FROM DEVICES

(75) Inventors: Jocelyn Barranco, Issy les Moulineaux (FR); Lars Kiessling, Chatillon (FR); Anne Julien, Noisy le Roi (FR)

(73) Assignee: France Telecom, Paris (FR)

( * ) Notice: Subject to any disclaimer, the term of this patent is extended or adjusted under 35 U.S.C. 154(b) by 344 days.

(21) Appl. No.: 11/994,368

(22) PCT Filed: Jun. 28, 2006

(86) PCT No.: PCT/FR2006/050646
§ 371 (c)(1),
(2), (4) Date: Mar. 28, 2008

(87) PCT Pub. No.: WO2007/003848
PCT Pub. Date: Jan. 11, 2007

(65) Prior Publication Data
US 2008/0209035 A1    Aug. 28, 2008

(30) Foreign Application Priority Data
Jun. 30, 2005    (FR) ...................................... 05 51859

(51) Int. Cl.
*G06F 15/16* (2006.01)
(52) U.S. Cl.
USPC .......................................... 709/251; 709/224
(58) Field of Classification Search
None
See application file for complete search history.

(56) References Cited

U.S. PATENT DOCUMENTS

| | | | |
|---|---|---|---|
| 5,844,808 A * | 12/1998 | Konsmo et al. | 700/244 |
| 5,928,367 A * | 7/1999 | Nelson et al. | 714/6 |
| 7,502,863 B2 * | 3/2009 | Sugihara et al. | 709/231 |
| 2001/0034791 A1 | 10/2001 | Clubb et al. | |
| 2002/0187775 A1 | 12/2002 | Corrigan et al. | |
| 2002/0194387 A1 * | 12/2002 | Defosse | 709/251 |
| 2003/0105825 A1 | 6/2003 | Kring et al. | |
| 2004/0137873 A1 * | 7/2004 | Kauppinen et al. | 455/404.1 |
| 2004/0203614 A1 * | 10/2004 | Qu et al. | 455/412.1 |
| 2004/0218609 A1 | 11/2004 | Foster et al. | |
| 2007/0161382 A1 * | 7/2007 | Melinger et al. | 455/456.1 |

FOREIGN PATENT DOCUMENTS

| | | |
|---|---|---|
| EP | 1 388 830 | 2/2004 |
| EP | 1388830 A1 | 2/2004 |

* cited by examiner

*Primary Examiner* — Bunjob Jaroenchonwanit
(74) *Attorney, Agent, or Firm* — Westman, Champlin & Kelly, P.A.; David D. Brush

(57) ABSTRACT

A communication device for implementing a system for remotely managing at least one item of equipment by a management application able to communicate via a telecommunication network with an application embedded in the item of equipment. The device includes a first communication interface allowing implementation of a local communication link with the embedded application, a second communication interface allowing access to the telecommunication network, and a communication management device configured to communicate with the embedded application via the first interface and with the management application via the second interface, serving as communication relay between the embedded application and the management application, and configured to transmit to one of the two applications a message received from the other application, according to predefined transfer rules and as a function of at least one parameter received with the message.

13 Claims, 7 Drawing Sheets

COMMUNICATIONS DEVICE AND SYSTEM FOR IMPLEMENTING A MANAGEMENT SYSTEM REMOTE FROM DEVICES

BACKGROUND OF THE INVENTION

1. Field of the Invention

The invention relates to a communication device for implementing a system for remotely managing equipment as well as a communication system for implementing a system for remotely managing equipment.

The invention applies to the technical field of machine to machine communications, denoted M2M for short. In these communication techniques, two categories of machine are considered:

- the first category consists of equipment intended to be controlled remotely and comprising an embedded application; this may for example be an automatic drinks dispenser, a water meter, etc.;
- the second category consists of computer systems of processing server type, integrating a management application intended to communicate with an application embedded in an item of equipment so as to manage this item of equipment remotely.

2. Discussion of the Background

Remote management of equipment can relate to various aspects: supervision of the equipment, its remote driving, remote parametrization and remote updating of the equipment or else the implementation of telemonitoring, telemetry, teledetection functions etc. This remote management is usually performed through message exchanges between the embedded application and the management application.

For example, in the case of a remote management system for automatic drinks dispensers, messages can be transmitted:

- on the one hand from the computer system to the dispensers, for example to modify the selling prices of the products sold, update the embedded application, or update the parameters of the machine;
- on the other hand from a dispenser to the computer system, for example to raise alarms in the event that a break-in or an electrical fault is detected, to upload information on the state of the dispenser's stock of drinks, to upload statistical information on the products consumed.

Current systems for remotely managing equipment do not exhibit sufficient performance as regards the management of M2M communication on account in particular of the complexity of this type of communication. Specifically, it involves a communication operating by commands/responses, requiring in order to be efficacious a certain degree of automation in the processing of the messages as well as guarantees in terms of reliability of the exchanges or in terms of quality of service.

Moreover, the current solutions in the field of M2M are very nonstandardized, and consequently, the development costs for implementing efficacious solutions are too high.

SUMMARY OF THE INVENTION

The aim of the invention is to provide a solution for remotely managing equipment not exhibiting the drawbacks cited in respect of the current solutions, facilitating the deployment and standardization of systems for remotely managing equipment, improving the degree of automation of the processing of the messages, while reducing the cost of making and maintaining these systems.

With this aim, the subject of the invention is a first communication device for implementing a system for remotely managing at least one item of equipment, by means of a management application able to communicate via a telecommunication network with an application embedded in said item of equipment, this first communication device comprising,

- a first communication interface for implementing a local communication link with said embedded application,
- a second communication interface for accessing said telecommunication network,
- communication management means able to communicate with said embedded application via said first interface and with said management application via said second interface and said telecommunication network,
- said communication management means serving as communication relay for the message-based communications between said embedded application and said management application,
- said communication management means being able to transfer at least one message, originating from one of the two applications to the other application, according to predefined transfer rules and as a function of at least one parameter, appended to said message and by means of which a transfer mode is specified for said message by the application sending said message.

In a symmetric manner, the subject of the invention is also a second communication device for implementing a system for remotely managing at least one item of equipment, by means of a management application able to communicate via a telecommunication network with an application embedded in said item of equipment, this communication device comprising,

- a first communication interface for implementing a communication link with said management application,
- a second communication interface for accessing said telecommunication network,
- a communication management module able to communicate with said management application via said first interface and with said embedded application via said second interface and said telecommunication network,
- said communication management means serving as communication relay for the message-based communications between said embedded application and said management application,
- said communication management means being able to transfer at least one message, originating from one of the two applications to the other application, according to predefined transfer rules and as a function of at least one parameter, appended to said message and by means of which a transfer mode is specified for said message by the application sending said message.

The first or second communication device according to the invention thus comprises an intelligent function for message transfer making it possible to meet the requirements of most equipment, relying on predefined transfer rules and controlled by means of one or more parameters appended to the messages to be transmitted.

Furthermore, this communication device, by dint of its dual interface, is adapted equally well for communication with the embedded application and for communication with the network. A generic communication device playing a role of intelligent interface between the item of equipment and the telecommunication network is thus made available.

Advantageously the transfer rules are independent of the embedded application and of the management application.

More generally, the communication device according to the invention is designed independently of the type of item of equipment to be managed, and independently of its embedded application or of the management application. It thus constitutes a generic, standardized module, ensuring the function of communication relay between the embedded application and the management application.

According to a variant embodiment, the communication management means are able to establish a communication session between said embedded application and said management application, the communication management means being transparent in relation to said session after the establishment of said session. The communication device is therefore adapted equally well to communication management in message mode and in session mode.

According to a variant embodiment of the module according to the invention, said at least one parameter comprises a first parameter defining a selection mode for selecting a data transport service to be used in the transmission of said message and the communication management means comprise data transport service selection means for selecting, as a function of said transfer rules and of said first parameter, a service from among several data transport services supported by said telecommunication network.

As a variant, said at least one parameter comprises a second parameter defining a priority level for said message to be transmitted and the data transport service selection means are designed to select, as a function of said transfer rules and as a function of said first and second parameters, a service from among several data transport services supported by said telecommunication network.

The communication device according to the invention thus integrates an advanced function for selecting a transport service, which is activated as a function of parameters received with the message or messages to be transmitted. The transfer function is thus parametrizable as a function of the requirements of the embedded application.

According to another variant embodiment of the module according to the invention, the data transport service selection means are designed to select a service as a function of a communication cost criterion or as a function of a quality of service criterion.

The communication device according to the invention thus allows an improvement in the quality and/or cost of machine to machine communications.

According to a variant embodiment, the first communication device according to the invention is adapted for communicating via said first interface with at least two items of equipment each integrating an embedded application and for routing a received message originating from said management application to the message recipient item of equipment as a function of at least one addressing data item appended to said message.

In this way, the first communication device is advantageously usable for a plurality of items of equipment, thereby greatly reducing the costs of achieving the solution for remotely managing equipment integrating such a communication device.

According to another variant embodiment, the first communication device according to the invention communicates with said management application by way of a communication relay interconnected with said communication network and comprises monitoring means for dispatching at regular time intervals to said communication relay a predefined message, conveyed via at least one data transport service and intended to allow the detection of predefined anomalies in the communication via said at least one data transport service.

The communication relay is for example a communication platform, adapted for the temporary storage of messages. The sending of predefined messages makes it possible to detect the presence of predefined anomalies in the communication between said communication device and said communication relay and to trigger an alert in the event that the communication is interrupted or deteriorates.

According to yet another variant embodiment, the first communication device according to the invention comprises monitoring means for:
  requesting said embedded application to dispatch a predefined message to it at regular time intervals,
  monitoring the reception of said predefined messages,
  alerting said management application in the event of anomaly or interruption in the reception of said predefined messages.

In this way the module is able to detect a malfunction of the embedded application having repercussions on its ability to communicate correctly.

The subject of the invention is also a communication system for implementing a system for remotely managing at least one item of equipment by means of a management application able to communicate via a telecommunication network with an application embedded in said item of equipment, said communication system comprising,
  a first communication device according to the invention,
  a second communication device according to the invention,
  said first device and said second device being designed to communicate with one another via said telecommunication network for implementing the communications between said management application and said embedded application.

The system according to the invention allows the implementation of an efficacious communication service of M2M type between the management application and the embedded application, exploiting the advantages of each of the communication devices.

In a particular embodiment of the communication system according to the invention, said first device and said second device are designed to communicate with one another by way of a communication platform serving as communication relay between said first module and said second module.

This embodiment allows the implementation, at the level of the platform of advanced communication functionalities, accessible by several management applications and complementary to those present in the first or the second communication device.

For example, said communication platform is adapted for requesting by message the first communication device to dispatch a predefined message to it at regular time intervals, and for alerting said management application in the event of anomaly or interruption in the dispatching of the predefined messages.

In this way, a reliability problem in respect of the message exchanges between the embedded application and the management or state of operation application of the first communication device can be detected.

BRIEF DESCRIPTION OF THE DRAWINGS

Other aims, characteristics and advantages of the invention will appear through the description which follows, given solely by way of nonlimiting example, and offered with reference to the appended drawings in which.

DESCRIPTION OF THE PREFERRED EMBODIMENTS

Figure 1A:
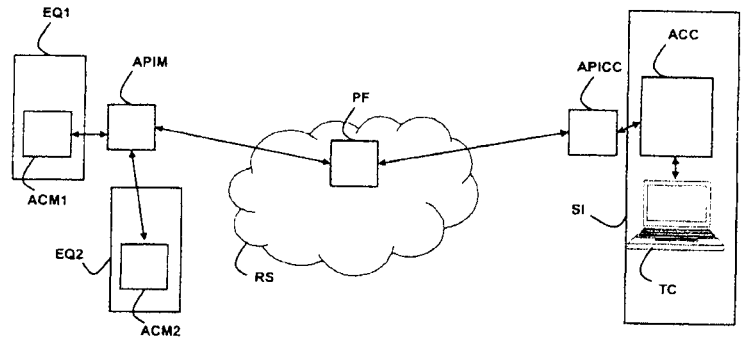
FIG. 1a is a diagrammatic representation of a first embodiment of a system for remotely managing equipment.

FIG. 1a is a diagrammatic representation of a first embodiment of a system for remotely managing equipment.

This system hinges around a telecommunication network RS. The telecommunication network RS is for example a cellular network, of GSM (Global System for Mobile communication), GPRS (General Packet Radio Service), UMTS (Universal Mobile Telecommunication System) type or else an IP (Internet Protocol) network, an X25 network, etc. The invention is described in the embodiment in which the telecommunication network RS is a GSM/GPRS cellular network.

The system for remotely managing equipment, represented in FIG. 1a, comprises an item of equipment EQ1 integrating an embedded application ACM1, able to communicate via the telecommunication network RS with a remote management application ACC, driven via a terminal TC and hosted for example in the computer system S1 of the company responsible for managing this item of equipment EQ1.

The system of FIG. 1a furthermore comprises a second item of equipment EQ2 integrating an embedded application ACM2, able to communicate via the telecommunication network RS with the remote management application ACC.

Remote management of the item of equipment is performed by data exchanges between the embedded application ACM1 or ACM2 and the management application ACC. These data exchanges can be performed by using communications in message mode (communication through messages of commands/responses type) or communications in "session mode" (communication through a data stream).

In the embodiment of FIG. 1a, the embedded application ACM1 communicates, respectively, the embedded application ACM2, with the management application ACC by way of a communication device APIM on the equipment side, of a communication platform PF and of a communication device APICC, on the management application side.

The communication device APIM constitutes a communication interface between the embedded application ACM1 and the telecommunication network RS. Likewise, the communication device APICC constitutes a communication interface between the management application ACC and the telecommunication network RS.

The device or communication module APIM on the equipment side is dubbed subsequently in the description in a simplified manner "module APIM". Likewise, the communication device or module APICC, on the management application side, is dubbed in a simplified manner "module APICC".

The communication device APIM is designed to be able to serve as communication interface for one or more items of equipment EQ1, EQ2, etc. The equipment management system can be generalized to a plurality of items of equipment, one and the same management application being capable of communicating via one and the same communication platform PF and one and the same communication device APIM with a plurality of items of equipment which are associated with it. As a variant, a given management application communicates with one or more communication devices APIM on the equipment side, each serving as communication interface for one or more items of equipment. Preferably a management application communicates via a single communication device APICC on the management application side.

The communication platform PF is preferably common to all the management applications and all the items of equipment and is hosted by a network operator. As a variant, the platform is common at least to a group of management applications and to their associated items of equipment.

The communication platform PF serves as communication relay and comprises in particular a data storage computer medium for temporary storage of the data exchanged between the management applications and the embedded applications. Optionally, it furthermore comprises data processing software modules used to process the data exchanged according to predefined processing rules. These processing rules comprise for example rules for processing the data as a function of their degree of priority, and a list of tests or actions to be performed on the data exchanged. A more detailed description of an exemplary embodiment of such a platform can be found in the patent document published under the number EP 1 388 830.

The communication device APIM serves as communication gateway for the two items of equipment associated with this module APIM. The data sent by the management application ACC and intended for the embedded application ACM1 are routed via the communication device APIM before being transferred to the embedded application ACM1. Likewise, the data sent by the management application ACC and intended for the embedded application ACM2 are routed via the communication device APIM before being transferred to the embedded application ACM2.

The protocol used for the communication between the communication device APIM and the communication platform PF is for example the BEEP protocol (Block Extensible Exchange Protocol) or another protocol adapted for the dispatching of messages.

The communications between the communication platform PF and communication device APICC use for example the SOAP message exchange standard (acronym standing for Simple Object Access Protocol), the HTTPS protocol (the secure version of HTTP, HyperText Transfer Protocol) and an XML data format (Extensible Markup Language).

Figure 1B:
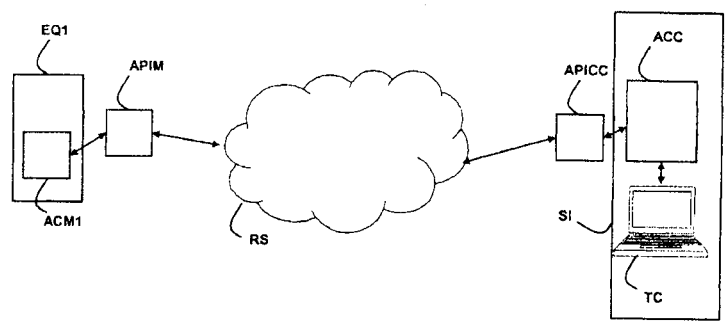
FIG. 1b is a diagrammatic representation of a second embodiment of a system for remotely managing equipment.

FIG. 1b is a representation of a second embodiment of a system for remotely managing equipment.

In this second embodiment, the communication devices APIM and APICC communicate directly with one another via the telecommunication network RS, without passing by way of a communication platform.

Figure 1C:
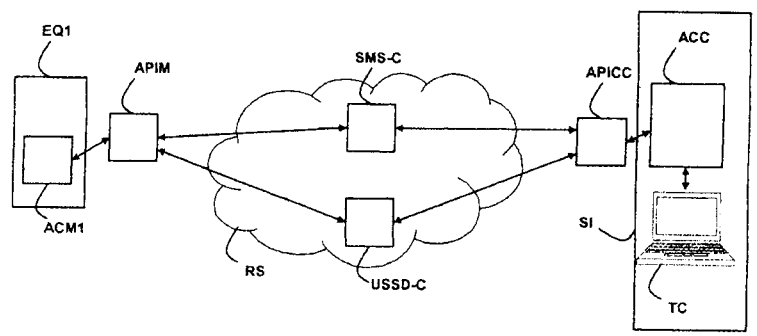
FIG. 1c is a diagrammatic representation of a third embodiment of a system for remotely managing equipment.

FIG. 1c is a representation of a third embodiment of a system for remotely managing equipment.

In this third embodiment, the communication devices APIM and APICC communicate with one another in message mode by means of the telecommunication network RS and by way of a message management center. This message management center is for example an SMS-C center (Short Message Service Center) in the case of data dispatch by the SMS service or else a USSD-C center (Unstructured Supplementary Service Data Center) in the case of data dispatch by the USSD service. Such message management centers are known in the field of GSM networks and will not be described in greater detail here. Their main function is to ensure temporary storage of the data that may not be transferred immediately to their recipient, in the case for example where the recipient's GSM terminal is not in reception state.

In this embodiment, the protocol used for the communication between the SMS-C center and the communication device APICC can be different from the protocol used for the communication between the communication device APIM and the SMS-C center. The protocol used for the communication between the communication device APIM and the communication platform PF, is the SMS protocol or another adapted for the transmission of SMS messages and compatible with the SMS-C center. The protocol used for the communication between the communication platform PF and the communication device APICC is for example the SOAP protocol or the SMPP protocol (Short Message Service—Peer to Peer).

The rest of the description will refer to the embodiment of FIG. 1a.

In the communication network RS, it is possible to implement two types of communication: communications in message mode and communications in session mode. The system according to the invention allows the implementation of these two types of communication between the management application ACC and the embedded application ACM1 or the embedded application ACM2, via the communication devices APIM and APICC.

The communications in message mode are customarily performed by means of messages or packets which carry the data to be transmitted exchanged between the embedded application ACM1 and the management application ACC. In GSM networks, various data transport services are available, for example:
 the SMS short message service (Short Message Service),
 the unstructured supplementary service for transmitting data USSD (Unstructered Supplementary Service Data),
 the service for transmitting data in circuit mode CSD (Circuit Switched Data) or HSCSD (High Speed Circuit Switched Data),
 the general radiocommunication service in GPRS packet mode (General Packet Radio Service).

In the system according to the invention, it is possible to establish, between the embedded application ACM1 and the management application ACC, a communication in message mode using selectively one or other of the data transport services cited. Furthermore, as described in greater detail hereinbelow, the invention makes it possible to exploit the presence of these various services to improve the quality of service or the cost of the communications between the embedded application ACM1 and the management application ACC.

Communications in session mode allow the establishment of a data stream between two entities. In the system according to the invention, it is possible to establish a communication in session mode between the embedded application ACM1 and the management application ACC. Such communications are performed by means of protocols appropriate to the session mode, for example HTTP or FTP.

Figure 2A:
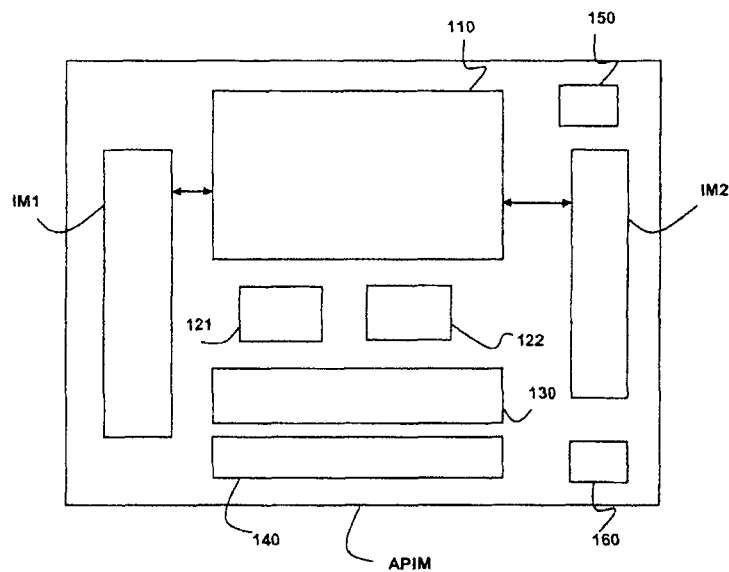
FIG. 2a is a diagrammatic representation of a first embodiment of a communication device according to the invention.

FIG. 2a is a diagrammatic representation of an embodiment of the first communication device according to the invention, appropriate to the realization of the communication device APIM on the equipment side.

The communication device APIM is embodied preferably by means of a microprocessor and comprises the following software or hardware elements:
 a first communication interface IM1,
 a second communication interface IM2,
 a communication management module 110,
 a module 121 for monitoring the communications performed via the interface IM1,
 a module 122 for monitoring the communications performed via the interface IM2,
 a module 130 for accessing services of the network,
 a configuration management module 140;
 a subscriber identification module 150;
 a data storage medium 160.

The communication interface IM1 allows the implementation of a local communication link with the embedded application ACM1; it comprises for example an IrDA port (Infrared Data Association) in the case of an infrared link, an NFC port in the case of a contactless link, a radio modem in the case of a Bluetooth link, or a serial interface in the case of a serial cable link. As a variant, when the module APIM is integrated in the item of equipment with the embedded application ACM1, the communication interface IM1 can be realized by means of a data bus or a simple software interface.

The communication interface IM2 allows access to the telecommunication network RS and data transmission via this network; it comprises for example a GSM/GPRS modem, a UMTS modem, an RTC modem, an ADSL modem, etc.

The communication management module 110, also designated hereinafter relay module 110, is able to communicate, on the one hand, with said embedded application ACM1 via the interface IM1 and, on the other hand, with the remote management application ACC via the interface IM2 and via the telecommunication network RS. This relay module 110 makes it possible to manage and relay the communications between the embedded application ACM1 and the management application ACC, respectively between the embedded application ACM2 and the management application ACC.

Figure 3A:
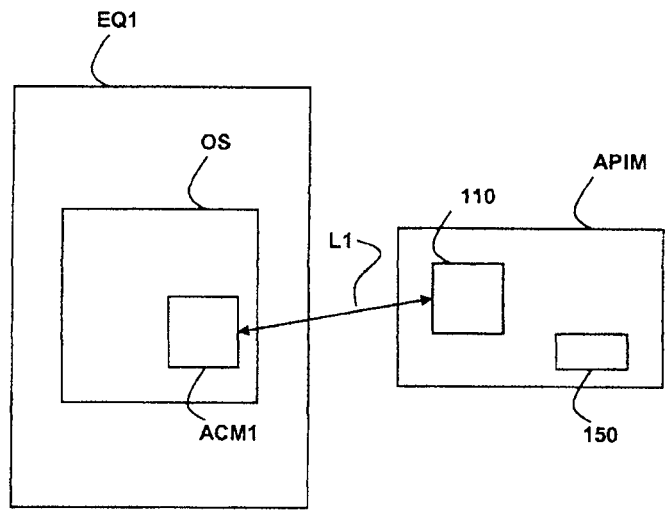
FIG. 3a is a diagrammatic representation of a first mode of communication between a communication device and an application embedded in an item of equipment.

FIG. 3a is a diagrammatic representation of the mode of communication between the relay module 110 of the communication device APIM and the embedded application ACM1 of the item of equipment EQ1.

In this communication mode, the communication between the relay module 110 of the communication device APIM and the embedded application ACM1 is carried out by means of a local communication link L1, for example a short range radio link according to the Bluetooth or WiFi standard.

Figure 3B:
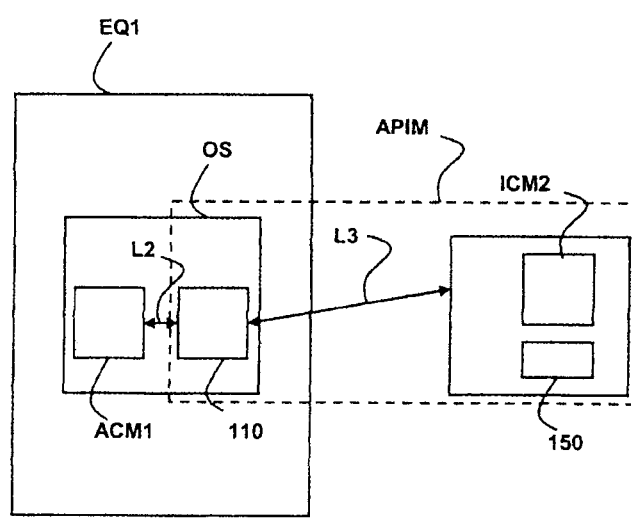
FIG. 3b is a diagrammatic representation of a second mode of communication between a communication device and an application embedded in an item of equipment.

FIG. 3b is a diagrammatic representation of a variant of the mode of communication between the relay module 110 of the communication device APIM and the embedded application ACM1 of the item of equipment EQ1.

According to this variant, a part of the communication device (communication management module 110) is integrated within the item of equipment EQ1 and the communication link between the module 110 and the embedded application ACM1 is implemented in the form of a simple software interface L2 by local function call. The other part of the communication device APIM (modules 150 and interface IM2) is external to the item of equipment. The two parts of the communication device APIM communicate via a local link L3, for example a radio, infrared or other link. The two parts of the communication device can of course be integrated completely within the item of equipment itself, this item of equipment then becoming autonomous.

The function of the monitoring module 121 is to detect the presence of predefined anomalies in the communication via the interface IM1, in particular in the communications with the embedded application ACM1.

The module 121 dispatches predefined messages, indicators of proper operation to the embedded application ACM1 to verify that the latter is responding thereto normally. These messages of proper operation are preferably dispatched at predefined time intervals. In the event of anomaly (absence of response or abnormal response or abnormal response lag), the module 121 triggers via the communication management module the dispatching of an alert message to the management application ACC.

As a variant, the module 121 requests the embedded application ACM1 to dispatch predefined messages, indicators of proper operation, to it at regular time intervals. In the event of anomaly (absence of message or abnormal message or abnormal lag between two messages), the module 121 triggers via the communication management module the dispatching of an alert message to the management application ACC.

The function of the monitoring module 122 is to detect the presence of predefined anomalies in the communication with the management application ACC, with a communication platform PF, with another device situated in the telecommunication network RS, or more generally, in accessing the telecommunication network RS via the various services offered.

The module 122 exchanges predefined messages, indicators of proper operation, with the communication platform PF and the latter verifies that it is receiving them normally. These messages of proper operation are preferably dispatched at predefined time intervals. In the event of anomaly (absence of message or abnormal message or abnormal lag between two messages), the communication platform PF triggers via the module APICC the dispatching of an alert message to the management application ACC, informing it in particular of an availability problem with one of the data transport services.

As a variant, the module 122 exchanges messages of proper operation not with the communication platform PF but with the module APICC directly.

The module 130 for accessing services of the network makes it possible to access predefined services accessible via the telecommunication network RS. Such a service is for example a service making it possible to obtain data of current date and time type. These data can be used for example for configuring the relay module 110 or the embedded application ACM1.

The configuration management module 140 makes it possible to manage the software configuration of the embedded application ACM1 and/or that of the communication device APIM itself, in particular to perform the software updates or downloads necessary for this software configuration. It integrates functionalities such as:
 determination of the current software version or versions,
 downloading and storage of the replacement software code,
 execution of the update,
 informing of the management application ACC via the communication management module 110 of the updates performed.

The subscriber identification module 150, for example of SIM type (Subscriber Identification Module), allows identification of the communication device APIM in the telecommunication network RS. In the context of the invention, it allows the storage of data such as:
 data identifying the communication device APIM, in the form for example of a PIN code (Personal Identification Number),
 data for implementing authentication functions and/or enciphering messages (cipher keys),
 list of addresses of authorized recipients or senders.

These data are optionally managed remotely by the management application ACC via the communication management module 110.

The data storage medium 160 is embodied for example in the form of a data memory. This medium is used in particular for the temporary storage of data or messages which are not transmitted immediately to their recipient.

The communication management module 110 is adapted equally well for management of communications in message mode, and for management of communications in session mode.

The communication management module 110 implements the functions for receiving and sending messages, as well as a function for transferring the received messages originating from the embedded application ACM1 to the management application ACC, and, symmetrically, for transferring the received messages originating from the management application ACC to the embedded application ACM1.

The transferring of the messages from the embedded application ACM1 to the management application ACC—or vice versa—is performed in accordance with transfer rules and as a function of transfer parameters dispatched by the message sender with the message proper. The messages received by the communication management module 110 are thus composed of the following elements:
 data intended for the module 110, comprising in particular message transfer and/or processing parameters,
 the data proper to be transmitted to their recipient, constituting the body of the message,
 message header data (address of the recipient or recipients, sub-addresses of the recipients in the event of a plurality of recipients, etc.).

The transfer and/or processing parameters are representative of message transfer instructions, respectively processing instructions. The transfer parameters are for example the following:
 "priority level of the message"; this parameter defines a priority level with respect to a predefined scale of priority levels; it is coded for example by means of a number lying between 1 and 4;
 "request of acknowledgment of receipt"; this parameter defines whether an acknowledgment of receipt is requested of the recipient by the sender; it is coded for example by means of a binary value;
 "request of acknowledgment of reading"; this parameter defines whether an acknowledgment of reading is requested of the recipient by the sender; it is coded for example by means of a binary value;
 "transport service"; this parameter defines the data transport service selection mode; it is coded for example by means of predefined values each corresponding to a predefined mode; the possible modes are for example: automatic mode (selection of a service from among a predefined list of services), preselection mode (preselection of a given service), etc.;

"encipherment request"; this parameter defines whether the message must be enciphered before transmission to the recipient; it is coded for example in the the form of a parameter taking a binary value;

The "priority level" parameter is used in combination with the other parameters to determine the message transmission mode and to implement message transfer priority management, as well as selection of the transport service appropriate to the priority level of the message.

Processing parameters can also be used together with rules for processing the messages taking these parameters into account. For example, the "encipherment request" processing parameter, coded by a binary value, is taken into account to perform or not an encipherment of the data of the message before transmission.

The transfer of the messages, and more generally the processing and management of the messages, are performed as a function of parameters, appended to the messages and representative of instructions, and in accordance with predefined rules, defined in relation to the values that these parameters can take. A message sending application can thus remotely control the communication management module 110 by specifying the mode of transfer or processing of the messages that it sends.

The message processing process comprises a first phase of analyzing the processing and/or transfer parameters, and a second phase of executing processing and/or transfer, depending on these parameters and the result of this analysis.

The module 110 firstly examines the "priority level" parameter of a message. This level is for example between 1 and 4. The processing depends on the "priority level" parameter and, optionally, the other parameters, in particular the "transport service" parameter:

level 1 messages: these are non-urgent messages; they are stored temporarily so as to be transmitted in a deferred manner, using any transport service or the least expensive, for example in a time slot during which the transmission tariff is low;

level 2 messages: these are messages of low priority; they are transmitted immediately; if the "transport service" parameter is set to automatic mode, any available transport service is used; if this parameter is set to preselection mode, the messages are transmitted on condition that the preselected transport service is available, otherwise they are placed on standby;

level 3 messages: these are messages of normal priority; they are transmitted immediately; the transport service is determined as a function of the "transport service" parameter; if this parameter is set to automatic mode, the message is dispatched as soon as a transport service is available; if this parameter is set to preselection mode, the message is dispatched as soon as the preselected transport service is available, level 4 messages: these are messages of high priority; they are transmitted immediately; these messages are transmitted preferably with systematic request of acknowledgment of receipt and reading; automatic selection of the transport service is preferably performed so that in the event of transmission failure on one service, another transport service is used.

When "request of acknowledgment of receipt" and "request of acknowledgment of reading" parameters are appended to a message, the request of acknowledgment of receipt/reading is transmitted end-to-end to the communication platform PF then to the communication device APICC, the communication management module 110 verifying proper reception of these acknowledgments and transmitting them to the message sender.

When the module APIM receives a message from the management application together with "request of acknowledgment of receipt" or "request of acknowledgment of reading" parameters, it is substituted for the embedded application ACM1 so as to dispatch the acknowledgment requested. This makes it possible to limit to the minimum the exchanging of messages between the module APIM and the embedded application ACM1.

Generalizing, the module APIM is substituted partially at least for the embedded application ACM1 for the management of the communications with the management application ACC. This results in a simplification in the realization of the equipment. On the other hand, however, the advanced functionalities implemented in the module APIM are completely independent of the item of equipment managed. This makes it possible to reconcile requirements regarding cost reduction and increased overall performance of the solution for remotely managing equipment.

The communication management module 110 furthermore comprises a function for selecting a data transport service; the selection of a transport service is performed as a function of predefined criteria, in particular as a function of customary quality of service criteria (reliability, bit rate, or transmission lag), or transmission cost criteria (for example, the least expensive service in relation to a given time span), and as a function of the management parameters received with the messages. The priority level associated with a data packet determines in particular which are the criteria to be considered.

The quality of service is determined either as a function of statistical data obtained by the communication device itself (statistics established for a set of communications by service and/or by recipient), or on the basis of data provided thereto by an outside measurement device, attached to the telecommunication network RS and with which the communication device APIM can communicate. Beneficial statistical data are for example the average duration of message transmission, the average transmission bandwidth, the average response lag for a message, etc.

The transmission costs are determined for example as a function of data provided by the service operators for each service offered and for each usage period (the time slot, the day of the week, etc.).

The communication management module 110 furthermore comprises a function for selecting a data transport service from among a predefined ordered list of services; this function selects, in the event of failure of the communication on a first data transport service, a second fallback data transport service.

The communication management module 110 furthermore comprises a function for enciphering and deciphering the messages for implementing secure communications between the embedded application ACM1 and the management application ACC relying on the keys stored in the storage medium 160.

The communication management module 110 furthermore comprises an authentication function for implementing, by means of the subscriber identification module 150, authentication protocols between the embedded application ACM1 and the management application ACC or else with a third party device attached to the network.

The communication management module 110 preferably comprises a filtering function for filtering incoming messages originating from the telecommunication network RS, for example by checking the message sender's address and rejecting messages not corresponding to a sender authorized with respect to a list of authorized senders, stored in the storage medium 160.

The communication management module 110 preferably comprises a filtering function for filtering messages output to the telecommunication network RS, for example by checking the message recipient's address and rejecting messages not corresponding to a recipient authorized with respect to a list of authorized recipients, stored in the storage medium 160.

The communication management module 110 furthermore comprises advanced communication functionalities, allowing the communication device APIM not only to serve as communication relay, but also to initiate communications to the embedded application ACM1, to the management application ACC or to another device attached to the network.

These communications are initiated for example in the following cases:
  following the detection of an anomaly by the monitoring module 121, to warn by message either the embedded application ACM2, or to restart the embedded application ACM1, or to warn by message the management application ACC;
  following a software update request made by the configuration management module 140, to warn by message the management application ACC of the course of the update procedure;
  following the obtaining of data (date, time) by the module 130 for accessing services of the network, to dispatch these data to the communication management module 110 and possibly to the embedded application ACM1.

Figure 2B:
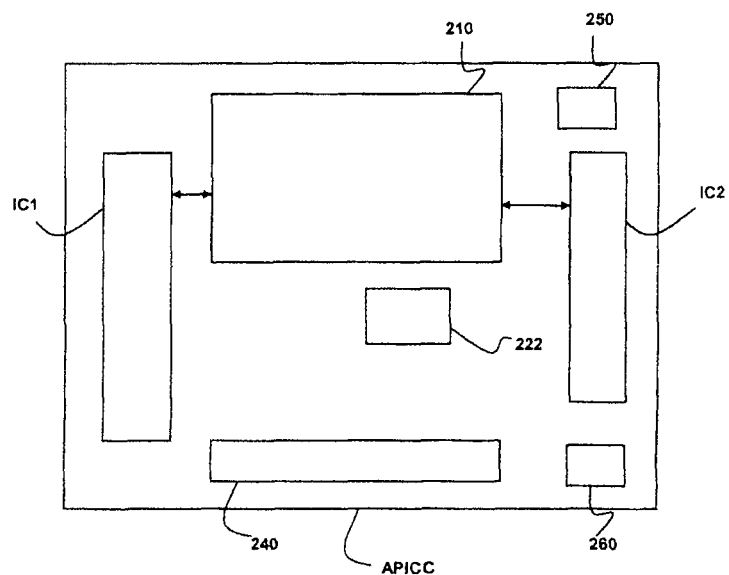
FIG. 2b is a diagrammatic representation of a second embodiment of a communication device according to the invention.

FIG. 2b is a diagrammatic representation of an embodiment of the second communication device according to the invention, appropriate for implementing the communication device APICC on the management application side.

The communication device APICC comprises in this embodiment the following modules:
  a first communication interface IC1,
  a second communication interface IC2,
  a communication management module 210,
  a module 222 for monitoring the communications performed via the interface IC2,
  a configuration management module 240
  a subscriber identification module 250,
  a data storage medium 260.

The communication devices APIM and APICC are embodied in a symmetric manner with respect to one another as regards their communication interfaces. The communication device APIM furthermore possesses additional functional modules with respect to the communication device APICC, making it possible for the item of equipment EQ1 associated with the communication device APIM to be afforded services and functions that improve the remote management and the communication possibilities of this item of equipment.

The differences and similarities between the module APIM and the module APICC will be presented.

The communication interface IC1 is, like the interface IM1, an interface allowing the implementation of a local communication link compatible with the management application ACC. The communication interface IC1 is for example a network interface to the local network of the computer system SI of the company. As a variant, when the management application ACC and the module APICC are integrated one and the same data processing server, the communication interface IC1 can be embodied by means of a data bus or a simple software interface by local function call.

The communication interface IC2 is identical to the interface IM2.

The communication management module 210, also designated relay module 210 hereinafter, is able to communicate, on the one hand, with the management application ACC via the interface IC1 and, on the other hand, with the remote embedded application ACM1 via the interface IC2 and via the telecommunication network RS. This relay module 210 makes it possible to manage and relay the communications between the embedded application ACM1 and the management application ACC.

The communication management module 210 is adapted equally well for management of communications in message mode, and for management of communications in session mode.

The module 210 is similar to the module 110 of the module APIM, with the difference that the roles, in relation to the sub-module 210, played respectively by the embedded application ACM1 and by the management application ACC are reversed with respect to the roles played in relation to the sub-module 110.

The module 222 for monitoring the communications performed via the interface IC2 is identical or similar to the module 122. In the case of the module 222, a failure in the communication with the communication platform PF or the module APIM gives rise to a triggering of an alert (for example by message dispatch) or the execution of a predefined procedure for managing this failure.

The configuration management module 240 is dedicated to the updating of the software configuration of the module APICC and is preferably not involved in the software configuration of the management application ACC.

The subscriber identification module 250 is identical or similar to the module 150.

The data storage medium 260 is identical or similar to the medium 160.

The module 110 for managing the communications of the module APIM is used in cooperation with the module 210 for managing the communications of the module APICC to establish the communications in session mode between the embedded application ACM1 and the management application ACC, the modules APIM and APICC no longer being involved once the communication session has been established.

Such a communication session is established either at the request of the management application ACC, or at the request of the embedded application ACM1. In the second case, the management application ACC requests by message the communication device APICC to establish a connection by indicating a certain number of parameters such as the quality of service requested, the necessary bit rate, etc. The communication device APICC selects, by means of its communication management module 210, the most suitable service for meeting the request of the management application ACC. In the case where the embedded application ACM1 is identified by the management application ACC by means of an alias, the module APICC furthermore determines the address of the embedded application ACM1 targeted. This address is for example an IP address or an identifier of MSISDN type (Mobile Station Integrated Services Digital Network). The address resolution procedure uses a database giving the correspondence between the aliases and the addresses, which is managed preferably at the communication platform PF level. This assumes that the module APICC interrogates the communication platform PF to obtain this address, before returning this address to the management application ACC. The management application ACC thereafter establishes the connection in session mode with the embedded application ACM1, the modules APIM and APICC no longer being involved after the establishment of the session between the management application ACC and the embedded application ACM.

FIGS. 4a through 4d give exemplary communications by message that can be established between the various entities of the management system according to the invention.

Figure 4A:
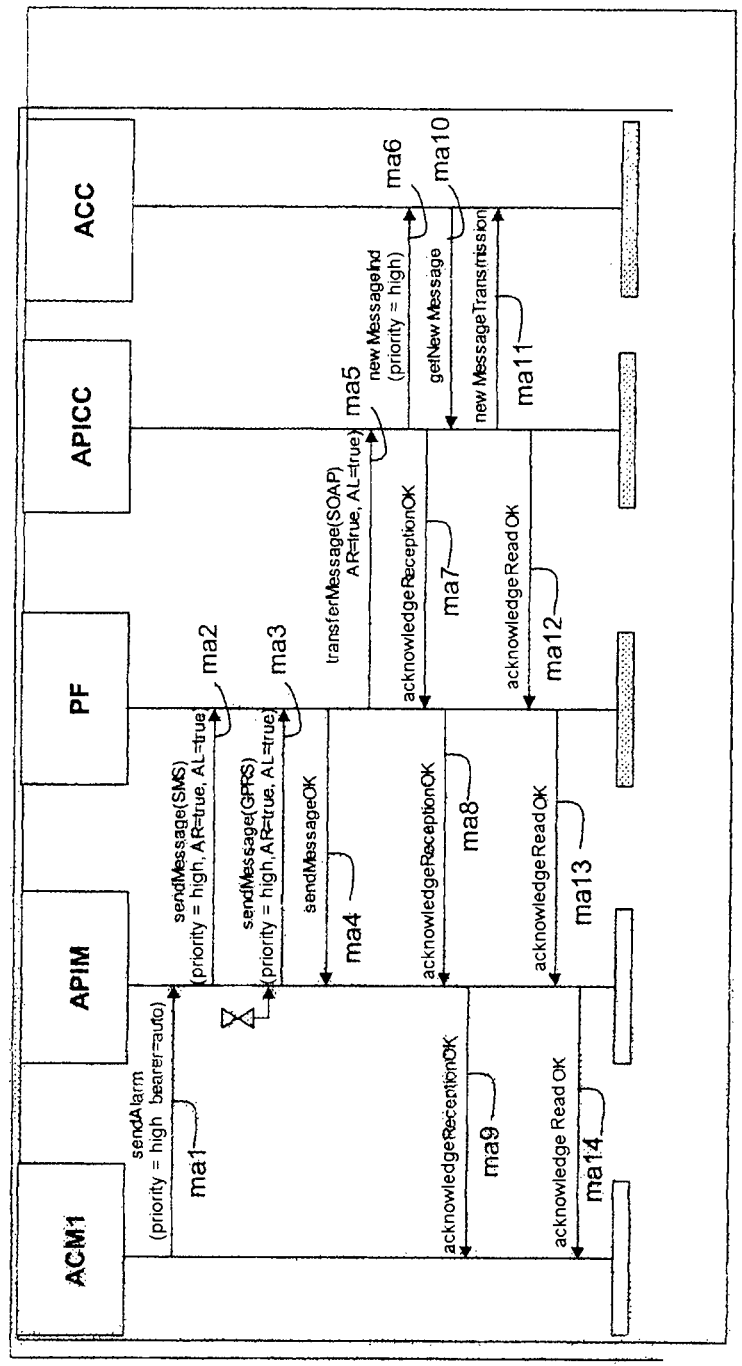
FIG. 4a is a diagrammatic representation of the messages exchanged in a system for remotely managing equipment corresponding to a first case of exchange of messages.

FIG. 4a is an exemplary communication by message performed on the initiative of the embedded application ACM1, in the case where an alarm has to be uploaded to the management application ACC, for example following the detection of an anomaly in the item of equipment.

The embedded application ACM1 requests the communication management module 110 to dispatch a message at high priority, in data transport service automatic selection mode, with request of acknowledgment of receipt and acknowledgment of reading. This entails the dispatching of a message ma1 comprising:

data generated by the embedded application ACM1 and intended for the management application ACC, an indicator parameter for the priority level of the message (high priority), an acknowledgment of receipt request indicator parameter (AR), an acknowledgment of reading request indicator parameter (AL), an indicator parameter for the selection mode chosen for the data transport service (automatic mode);

On receipt of this message, the communication management module 110 sends the communication platform PF a first message ma2, choosing a data transport service. The data transport service selection mode being the automatic mode, the selection of the data transport service is left to the initiative of the communication management module 110. In this case, the communication management module 110 selects the data transport service defined by default. If the transmission on this default transport service does not complete (in particular absence of response of the communication platform PF), the communication management module 110 automatically tries to transmit a second message ma3, using another transport service from among the available services. The communication management module 110 tries again in the event of failure, until the message is transmitted successfully to the communication platform PF.

When the communication platform PF receives the second message ma3, it sends a message ma4 to the communication management module 110 to notify it that the message ma3 has been properly received, records the message ma3 then transmits a message ma5 to the communication management module 210, to notify the arrival of a new message for the management application ACC.

The communication management module 210 then downloads the data of the recorded message ma3, then dispatches a message ma6 to the management application ACC to signal to it the arrival of a new message. It dispatches an acknowledgment of receipt message ma7 to the communication platform PF. The communication platform PF in turn dispatches an acknowledgment of receipt message ma8 to the communication management module 110; the communication management module 110 in turn dispatches an acknowledgment of receipt message ma9 to the embedded application ACM1.

The management application ACC requests by a message ma10 the communication management module 210 to transfer the downloaded message to it; the communication management module 210 transfers to the management application ACC a message ma11 which comprises the data of the downloaded message, then dispatches an acknowledgment of reading message ma12 to the communication platform PF; the communication platform PF in turn dispatches an acknowledgment of reading message ma13 to the communication management module 110; the communication management module 110 in turn dispatches an acknowledgment of reading message m14 to the embedded application ACM1.

The communication device APIM implements, in a manner that is transparent for the embedded application ACM1, an automatic management, via the communication platform PF and the communication device APICC, of the acknowledgments of receipt and of the acknowledgments of reading: the embedded application ACM1 receives these acknowledgments as if it were communicating directly with the communication device APICC.

Furthermore, the system implements end-to-end management of the priorities between messages since the communication device APIM, the communication device APICC and the communication platform PF are all equally capable of managing the concept of priority between messages.

Figure 4B:
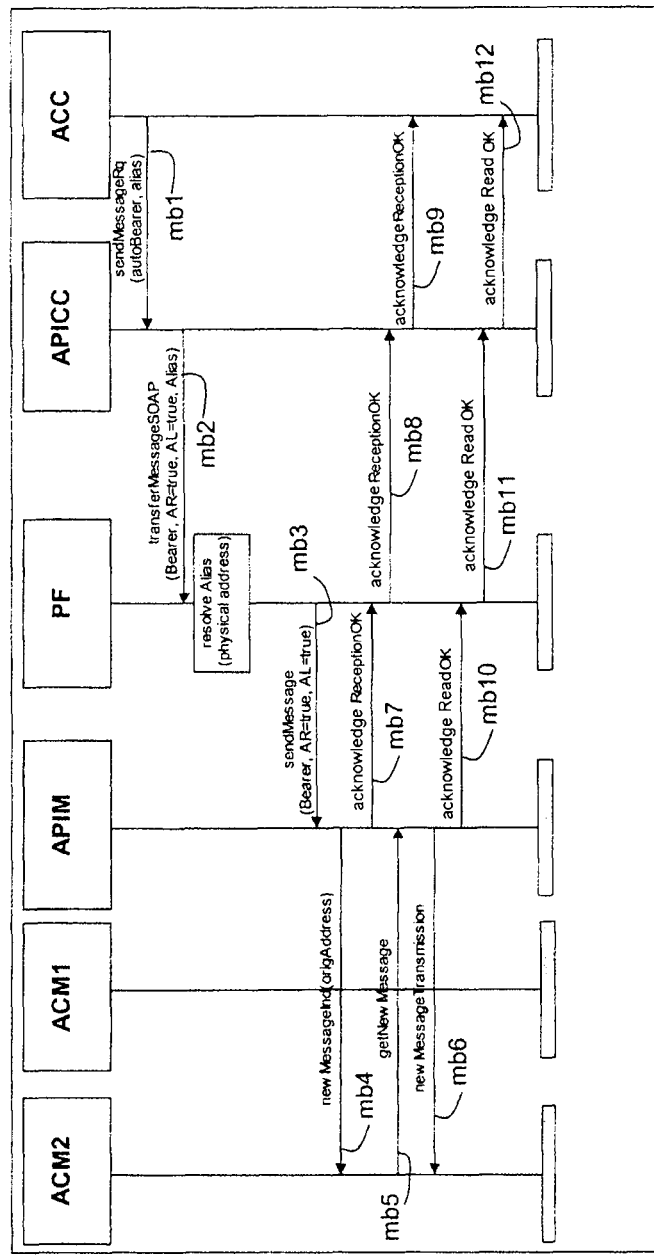
FIG. 4b is a diagrammatic representation of the messages exchanged in a system for remotely managing equipment corresponding to a second case of exchange of messages.

The case of FIG. 4b shows the dispatching of a message from the management application ACC to an item of equipment EQ2 which forms part of a sub-network. This configuration is represented in FIG. 1a. In this case, the management application ACC dispatches a message mb1 to request the communication device APICC to dispatch a message to the item of equipment EQ2, using an alias to identify it.

The communication device APICC transfers the message mb2 to the communication platform PF which determines, on the basis of the alias, the physical address of the communication device APIM on which the item of equipment EQ2 depends, then transfers to it the message mb3 to the communication device APIM. The latter thereafter transfers a message mb4 to the final recipient, that is to say to item of equipment EQ2.

The embedded application ACM2 of the item of equipment EQ2 requests mb5 the communication device APIM to transfer the message to it. The communication device APIM transfers the message mb6 to the embedded application ACM2.

The communication device APIM handles the transmission to the management application ACC of an acknowledgment of receipt via the messages mb7, mb8 and mb9 following the receipt of the message mb3. The communication device APIM also handles the transmission to the management application ACC of an acknowledgment of reading via the messages mb10, mb11 and mb12 following the loading of the message mb6 by the embedded application ACM2.

Figure 4C:
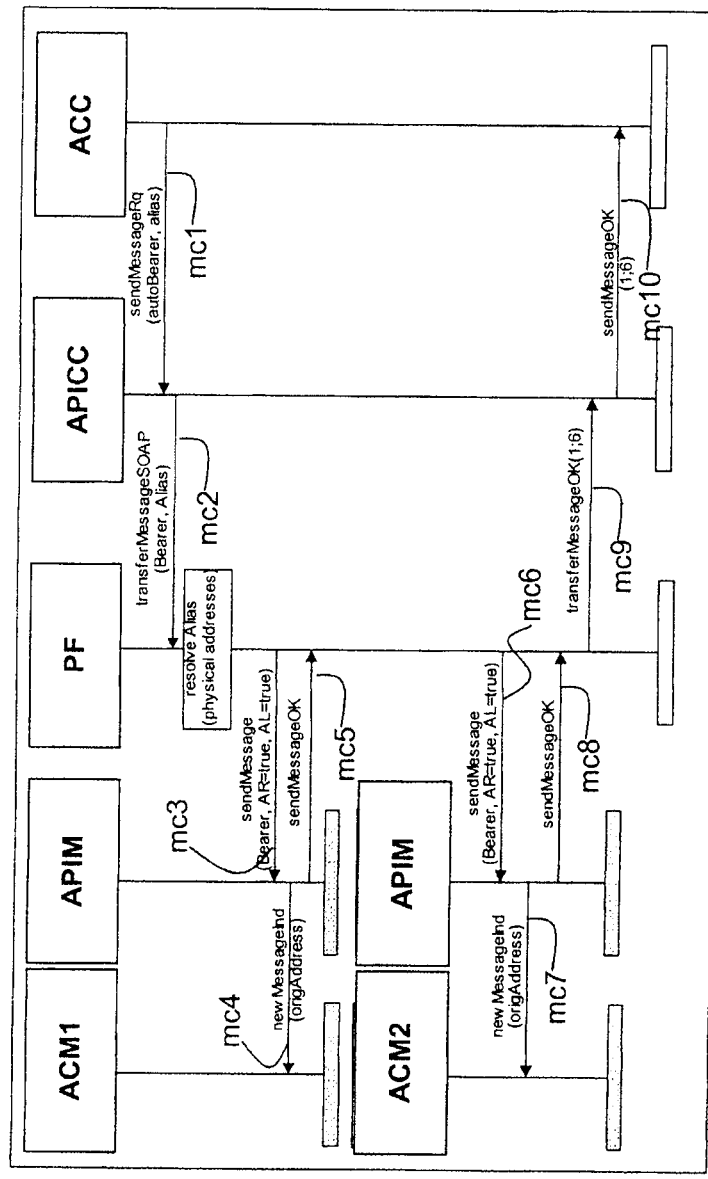
FIG. 4c is a diagrammatic representation of the messages exchanged in a system for remotely managing equipment corresponding to a third case of exchange of messages.

The case of FIG. 4c shows the dispatching of one and the same message to a group of items of equipment which is represented in a simplified manner by the items of equipment EQ1, EQ2. In this case, the management application ACC dispatches a message mc1 to the communication device APICC to request it to dispatch a message to the group of items of equipment, using an alias to identify this group.

The communication device APICC transfers the message mc2 to the communication platform PF which determines on the basis of the alias the physical addresses of the various items of equipment, and therefore the physical address of the communication device APIM on which each of these items of equipment depends.

The communication platform PF transfers a first message mc3 to the communication device APIM for the embedded application ACM1 of the first item of equipment EQ1. At least one addressing data item is appended to this message allowing the module APIM to identify the message recipient item of equipment. The message is then transferred mc4 to the embedded application ACM1 by the communication device APIM which dispatches an acknowledgment mc5 to the PF.

The communication platform PF transfers a second message mc6 to the communication device APIM for the embedded application ACM2 of the second item of equipment EQ2. At least one addressing data item is appended to this message allowing the module APIM to identify the message recipient item of equipment. The message is then transferred mc7 to the embedded application ACM1 by the communication device APIM which dispatches an acknowledgment mc8 to the PF.

It is the platform PF which receives the acknowledgments from all the items of equipment and which makes a single response mc9, mc10 to the management application ACC containing the result.

As a variant, when all the recipient items of equipment are associated with one and the same communication device APIM, a single message can be transmitted from the communication platform PF to this module APIM which then handles the dispatching of a global acknowledgment when all the recipient items of equipment have received the message intended for them.

Figure 4D:
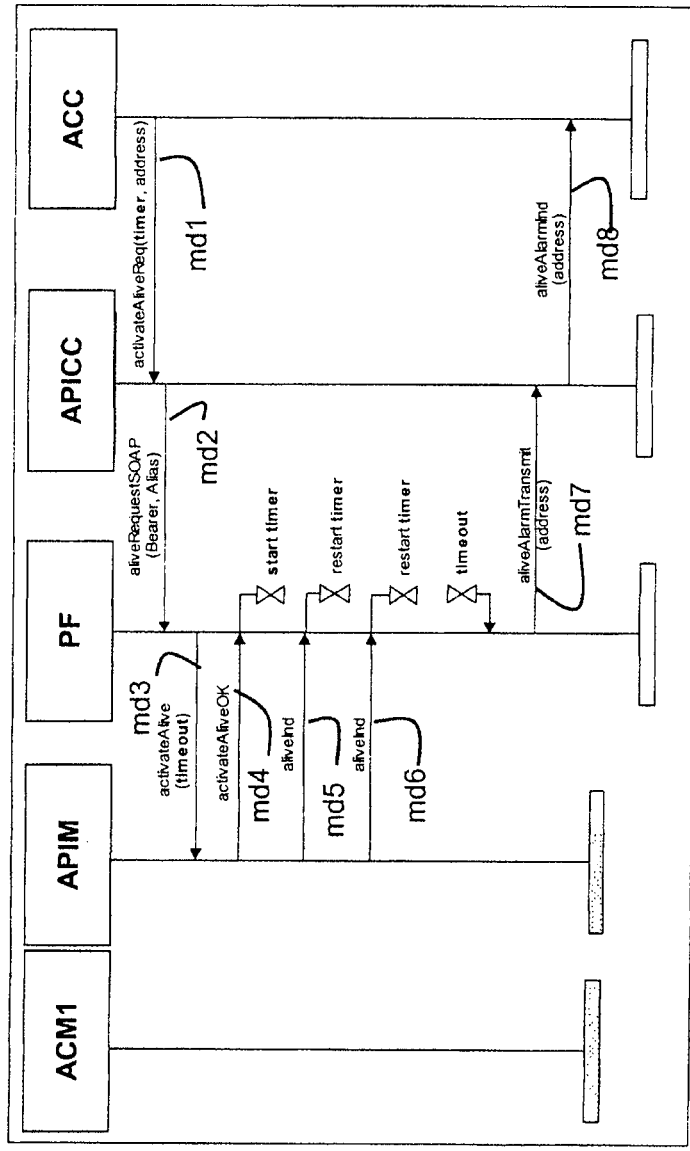
FIG. 4d is a diagrammatic representation of the messages exchanged in a system for remotely managing equipment corresponding to a fourth case of exchange of messages.

The case of FIG. 4d shows the implementation of the monitoring function implemented between the sub-module 122 and the communication platform PF. To invoke this function, the management application ACC requests the activation of this functionality by a first message md1 transferred via communication device APICC in the form of a request md2 to the platform PF.

The platform PF transfers by a message md3 the request to the communication device APIM, then triggers a counter. Thereupon, the module APIM regularly dispatches messages md4, md5, md6 to the platform PF to reset the counter of the communication platform PF to zero.

In the case where the module APIM is unable to communicate, the counter will reach a predefined maximum value, and the communication platform PF will trigger an alert procedure to warn the management application ACC of the communication problem. This alert procedure consists for example in the dispatching of an alarm message md7, transferred md8 to the management application ACC by the communication device APICC.

Other message exchange protocols can be defined for implementing various situations or various cases of use of the communication devices APIM and APICC.

These two modules constitute intelligent communication relays, handling advanced communications functions, controlled as a function of the requirements of the application embedded in the equipment or of the management application. They make it possible to afford a certain degree of standardization in the deployment of M2M solution, because they integrate generic communication functions adapted and adaptable to most equipment. This results in a simplification of the design of the equipment and reduced cost of deploying the remote equipment management systems.

The invention claimed is:

1. A communication system for implementing a system for remotely managing at least one item of equipment by a management application configured to communicate via a telecommunication network with an application embedded in the item of equipment, the communication system comprising:
 a first communication device for implementing a system for remotely managing the at least one item of equipment, by the management application configured to communicate via the telecommunication network with the application embedded in the item of equipment, the first communication device comprising:
  a first communication interface configured to implement a communication link with the management application;
  a second communication interface configured to access the telecommunication network; and
  first communication management means configured to communicate with the management application via the first interface and with the embedded application via the second interface and the telecommunication network,
  the first communication management means serving as a communication relay for the message-based communications between the embedded application and the management application,
  the first communication management means configured to transfer at least one message, originating from one of the two applications to the other application, according to predefined transfer rules and as a function of at least one parameter, appended to the message and by which a transfer mode is specified for the message by the application sending the message,
 a second communication device for implementing a system for remotely managing the at least one item of equipment, by the management application configured to communicate via the telecommunication network with the application embedded in the item of equipment, the second communication device comprising:
  a third communication interface configured to implement a local communication link with the embedded application;
  a fourth communication interface configured to access the telecommunication network; and
  second communication management means configured to communicate with the embedded application via the third interface and with the management application via the fourth interface and the telecommunication network;
  said second communication management means serving as a communication relay for message-based communications between the embedded application and the management application,
  said second communication management means configured to transfer the at least one message, originating from one of the two applications to the other application, according to the predefined transfer rules and as a function of the at least one parameter, appended to the message and by which the transfer mode is specified for the message by the application sending the message,
 said first communication device and said second communication device configured to communicate with one another via the telecommunication network for implementing communications between the management application and said embedded application.

2. A communication system as claimed in claim 1, wherein the first communication device and the second communication device are configured to communicate with one another by a communication platform serving as a communication relay between the first device and the second device.

3. A communication system as claimed in claim 2, wherein the communication platform is adapted for requesting by message the first communication device to dispatch a predefined message to it at regular time intervals, and for alerting the management application in event of an anomaly or interruption in dispatching of the predefined messages.

4. A communication system as claimed in claim 1, wherein the transfer rules are independent of the embedded application and of the management application.

5. A communication system as claimed in claim 1, wherein at least one of the first or second communication management means is further configured to establish a communication session between the embedded application and the management application, the communication management means being transparent in relation to the session after establishment of the session.

6. A communication system as claimed in claim 1, wherein the first communication management means is further configured to communicate via the first interface with at least two items of equipment each integrating an embedded application and for routing a received message originating from the management application to a message recipient of the at least two items of equipment as a function of at least one addressing data item appended to the message.

7. A communication system as claimed in claim 1, wherein at least one of the first or second communication devices comprises monitoring means for dispatching at regular time intervals to the communication relay of the respective first or second communication management means a predefined message, conveyed via at least one data transport service and to allow detection of predefined anomalies in the communication via the at least one data transport service.

8. A communication system as claimed in claim 1, further comprising monitoring means for:
   requesting the embedded application to dispatch a predefined message to it at regular time intervals,
   monitoring reception of the predefined messages, and
   alerting the management application in event of an anomaly or interruption in reception of the predefined messages.

9. A communication system as claimed in claim 1, wherein the at least one parameter comprises a first parameter defining a selection mode for selecting a data transport service to be used in the transmission of the message, and wherein at least one of the first or second communication management means comprises data transport service selection means for selecting, as a function of the transfer rules and of the first parameter, a service from among plural data transport services supported by the telecommunication network.

10. A communication system as claimed in claim 9, wherein the at least one parameter comprises a second parameter defining a priority level for the message to be transmitted, and wherein the data transport service selection means is configured to select, as a function of the transfer rules and as a function of the first and second parameters, a service from among plural data transport services supported by the telecommunication network.

11. A communication system as claimed in claim 9, wherein the selection means is configured to select, in event of communication failure of a first transport service, a second fallback transport service.

12. A communication system as claimed in claim 9, wherein the data transport service selection means is configured to select a service as a function of a communication cost criterion.

13. A communication system as claimed in claim 9, wherein the data transport service selection means is configured to select a service as a function of a quality of service criterion.

* * * * *

UNITED STATES PATENT AND TRADEMARK OFFICE
CERTIFICATE OF CORRECTION

PATENT NO.        : 8,589,595 B2                                            Page 1 of 1
APPLICATION NO.   : 11/994368
DATED             : November 19, 2013
INVENTOR(S)       : Barranco et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 549 days.

Signed and Sealed this
Twenty-second Day of September, 2015

Michelle K. Lee
*Director of the United States Patent and Trademark Office*